United States Patent
Huang et al.

(10) Patent No.: US 12,536,177 B1
(45) Date of Patent: Jan. 27, 2026

(54) INCREMENTAL SEARCH RESULTS FOR SEQUENTIAL PARTIAL DATA QUERIES

(71) Applicant: Anomali Incorporated, Redwood City, CA (US)

(72) Inventors: Wei Huang, Los Altos Hills, CA (US); Yizheng Zhou, San Mateo, CA (US); Hugh Seretse Njemanze, Redwood City, CA (US)

(73) Assignee: Anomali Incorporated, Redwood City, CA (US)

( * ) Notice: Subject to any disclaimer, the term of this patent is extended or adjusted under 35 U.S.C. 154(b) by 0 days.

(21) Appl. No.: 19/041,894

(22) Filed: Jan. 30, 2025

Related U.S. Application Data

(60) Provisional application No. 63/723,790, filed on Nov. 22, 2024, provisional application No. 63/723,772,
(Continued)

(51) Int. Cl.
*G06F 16/2455* (2019.01)
*G06F 9/50* (2006.01)
(Continued)

(52) U.S. Cl.
CPC ...... *G06F 16/24553* (2019.01); *G06F 9/5066* (2013.01); *G06F 16/24535* (2019.01); *G06F 16/2471* (2019.01)

(58) Field of Classification Search
CPC ............. G06F 16/243; G06F 16/24522; G06F 16/24532; G06F 16/24535; G06F 16/24553; G06F 16/2471; G06F 9/5066
See application file for complete search history.

(56) References Cited

U.S. PATENT DOCUMENTS

| | | | |
|---|---|---|---|
| 12,182,147 B1* | 12/2024 | Merchant | G06N 20/00 |
| 2011/0153662 A1* | 6/2011 | Stanfill | G06F 16/24532 |
| | | | 707/774 |

(Continued)

FOREIGN PATENT DOCUMENTS

| | | | | |
|---|---|---|---|---|
| CN | 109241103 A | | 1/2019 | |
| CN | 113157431 A | * | 7/2021 | G06F 9/5083 |

(Continued)

OTHER PUBLICATIONS

PCT International Search Report and Written Opinion, PCT Application No. PCT/US2025/013905 dated Aug. 14, 2025, 10 pages.

(Continued)

*Primary Examiner* — James E Richardson
(74) *Attorney, Agent, or Firm* — Fenwick & West LLP

(57) ABSTRACT

An application receives user input of a search query by way of a search interface. The application determines a task based on the search query, and divides the task into a plurality of sub-tasks, at least some of the plurality of sub-tasks divided for parallel processing by different compute components. The application receives publication of partial results from the different compute components as those partial results are completed by their respective compute components. The application inputs the partial results into a reducer to create an aggregate partial result, and generates for display the aggregate partial result within the search interface, where the aggregate partial result is updated in real time as further partial results are published.

18 Claims, 14 Drawing Sheets

Related U.S. Application Data filed on Nov. 22, 2024, provisional application No. 63/723,794, filed on Nov. 22, 2024.

(51) Int. Cl.
*G06F 16/2453* (2019.01)
*G06F 16/2458* (2019.01)

(56) References Cited

U.S. PATENT DOCUMENTS

| | | |
|---|---|---|
| 2017/0214707 A1 | 7/2017 | Grubel et al. |
| 2018/0182398 A1* | 6/2018 | Halstvedt ............ G06F 16/3329 |
| 2019/0057153 A1 | 2/2019 | Relkin et al. |
| 2020/0320136 A1 | 10/2020 | Paltanavicius et al. |
| 2021/0064642 A1 | 3/2021 | Qian et al. |
| 2023/0252136 A1 | 8/2023 | Kim |
| 2023/0385275 A1 | 11/2023 | Obeidi et al. |
| 2024/0105172 A1 | 3/2024 | Kim et al. |
| 2024/0256545 A1* | 8/2024 | James ................. G06F 16/2228 |
| 2024/0281472 A1 | 8/2024 | Larhette et al. |
| 2024/0428275 A1* | 12/2024 | Luus .................. G06Q 30/0631 |

FOREIGN PATENT DOCUMENTS

| | | | | |
|---|---|---|---|---|
| CN | 111752970 B | | 1/2024 | |
| CN | 117370519 A | | 1/2024 | |
| CN | 117609380 A | * | 2/2024 | |
| CN | 118210625 A | * | 6/2024 | ........... G06F 9/4843 |
| CN | 119226575 A | * | 12/2024 | |

OTHER PUBLICATIONS

PCT International Search Report and Written Opinion, PCT Application No. PCT/US2025/013906 dated Aug. 22, 2025, 11 pages.

* cited by examiner

Search

Saved Search ▽ | 1 | Enter a search ....

Query: Save | Saved as | Manage

Learn AQL   Result   Visualization

✦ Copilot

Natural Language Examples

-- Have I been affected by MoveIt?

-- List 100 allow or accept events. Show fields action, src, src_port, dest, dest_port, bytes_in and bytes_out -- Show me logins for users in the last hour.

-- What are the top 100 destination hosts on my network?

-- What are the top 10 source types?

-- Show me all Errors with a category of d4ex coming from Match Cloud

-- Show me all logs where the user is srutherford

-- Show me the results coming from 89.19.92.176

🕐 | ⊙ Last 1 hour | 🔍 Search

Absolute time range

From
now-1h

To
now

Apply time range

Browser Time United States, PST        UTC-08:00

| Last 30 days |
| Last 90 days |
| Last 6 months |
| Last 1 year |
| Last 2 years |
| Last 5 years |

```
1  | where action (in 'allow', 'accept')
2  | fields action, src, src_port, dest, dest_port, bytes_in,
     bytes_out
3  | limit 100 -- list 100 allow or accept events. show fields
     action, src, src_port, dest, dest_port, bytes_in and bytes_out
```

```
1  | where sourcetype contains "crowdstrike" and event_name contains
     "LogonFailed"
2  | timetrend count as event_count by user span=12h
3  | sort event_count desc
```

Search

Saved Search ▾ | 1 | eventlog | where action="api.request" | where sourcetype = 'githubcloud' | aggr count | ⟲ | ⊙ Last 2 years ▾ | 🔍 Search Query: Save | Saved as | Manage Learn AQL     Visualization Result Results     699,085,413,274 Scanned (30 Seconds) Job ⊙

450

| 25 ▾ | | | 1-1 of 1 results | ‹ Prev | 1 | - Next › | ✱ |
|---|---|---|---|---|---|---|---|
| AGGR_COL1... ⋮ | | | | | | | |
| ⋀ 1,859,213 | | | | | | | |

710 — Receive user input of a search query by way of a search interface

720 — Determine a task based on the search query

730 — Divide the task into a plurality of sub-tasks, at least some of the plurality of sub-tasks divided for parallel processing by different compute components

740 — Receive publication of partial results from the different compute components as those partial results are completed by their respective compute components

750 — Input the partial results into a reducer to create an aggregate partial result

760 — Generate for display the aggregate partial result within the search interface, wherein the aggregate partial result is updated in real time as further partial results are published

*FIG. 7*

INCREMENTAL SEARCH RESULTS FOR SEQUENTIAL PARTIAL DATA QUERIES

CROSS REFERENCE TO RELATED APPLICATIONS

This application claims the benefit of priority to U.S. Provisional Patent Application Nos. 63/723,772, 63/723,790, and 63/723,794, filed on Nov. 22, 2024, which are incorporated herein by reference in their entirety for all purposes.

TECHNICAL FIELD

This disclosure generally relates to machine learning, and more particularly relates to an improved task distribution and user interface for natural language searches performed by large language models.

BACKGROUND

Traditional natural language search tools query large databases having vast amounts of information. Only after the trove of information is fully processed is a result output by traditional tools. This problem compounds in specialized circumstances, such as threat hunting, where a compendium of billions or trillions (or more) of entries collected over decades or more may need to be consulted to provide an output. The latency in a large language model processing this amount of data may result in hours or days before a result is returned to a user. Moreover, this results in a waste of processing power and computational expense, as the result might not even be useful.

Furthermore, due to constraints in an amount of data that Cloud Service Providers (CSPs) can process, this data must be extracted from data centers, which itself poses inefficiencies, in that the data centers must provide capacity for huge transfers of data, even though that capacity goes unused most of the time. That is, requests for searching through external sources by a CSP may be rejected where a load of the request exceeds a size, which may be the case when a search through millions, billions, or trillions (or more) of files is received. This may be the case because a given cluster to which tasks may be allocated may have finite capacity.

An inability to rely on CSPs inhibits natural language search performance on large amounts of files because advantages that CSPs provide are not able to be realized. For example, cloud service providers have massive reliability due to redundant systems, low latency, and virtually unlimited scalability (e.g., due to usage of spot instances, on-demand compute capacity, and so on). Traditional data centers and on-prem solutions, on the other hand, suffer reliability constraints and latency constraints (e.g., where data centers that are geographically far apart need to intercommunicate in order to process a request). Cloud service providers are not traditionally used for search in the manner described herein at least because of their load limitations.

SUMMARY

The systems and methods disclosed herein enable usage of CSPs to facilitate natural language searches using large language models. To enable this, the a real-time search tool divides a task required to service a user-input query into sub-tasks. By dividing the task into sub-tasks using the systems and methods disclosed herein, the sub-tasks are each small enough to be run using CSP resources. Moreover, an improved user interface is yielded that is able to produce partial results in real time to the user as those results are determined. This in turn enables a user to halt a current search and, as needed begin a new or updated search, on an iterative basis, until the user's questions are fully satisfied. What results is faster access to information and consumption of dramatically fewer computational resources as a result of early halting of searches, thereby resulting in an improvement in underlying technology and an improvement to the user interface itself.

In some embodiments, a real-time search tool receives user input of a search query by way of a search interface. The real-time search tool determines a task based on the search query, and divides the task into a plurality of sub-tasks, at least some of the plurality of sub-tasks divided for parallel processing by different compute components. The real-time search tool receives publication of partial results from the different compute components as those partial results are completed by their respective compute components. The real-time search tool inputs the partial results into a reducer to create an aggregate partial result, and generates for display the aggregate partial result within the search interface, where the aggregate partial result is updated in real time as further partial results are published.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 4A-4E illustrate a sequence of user interfaces as a search query is updated incrementally during an incrementally updated real-time search.

FIG. 7 illustrates a flowchart of a process for providing partial search results a sub-tasks of a search query task are completed.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
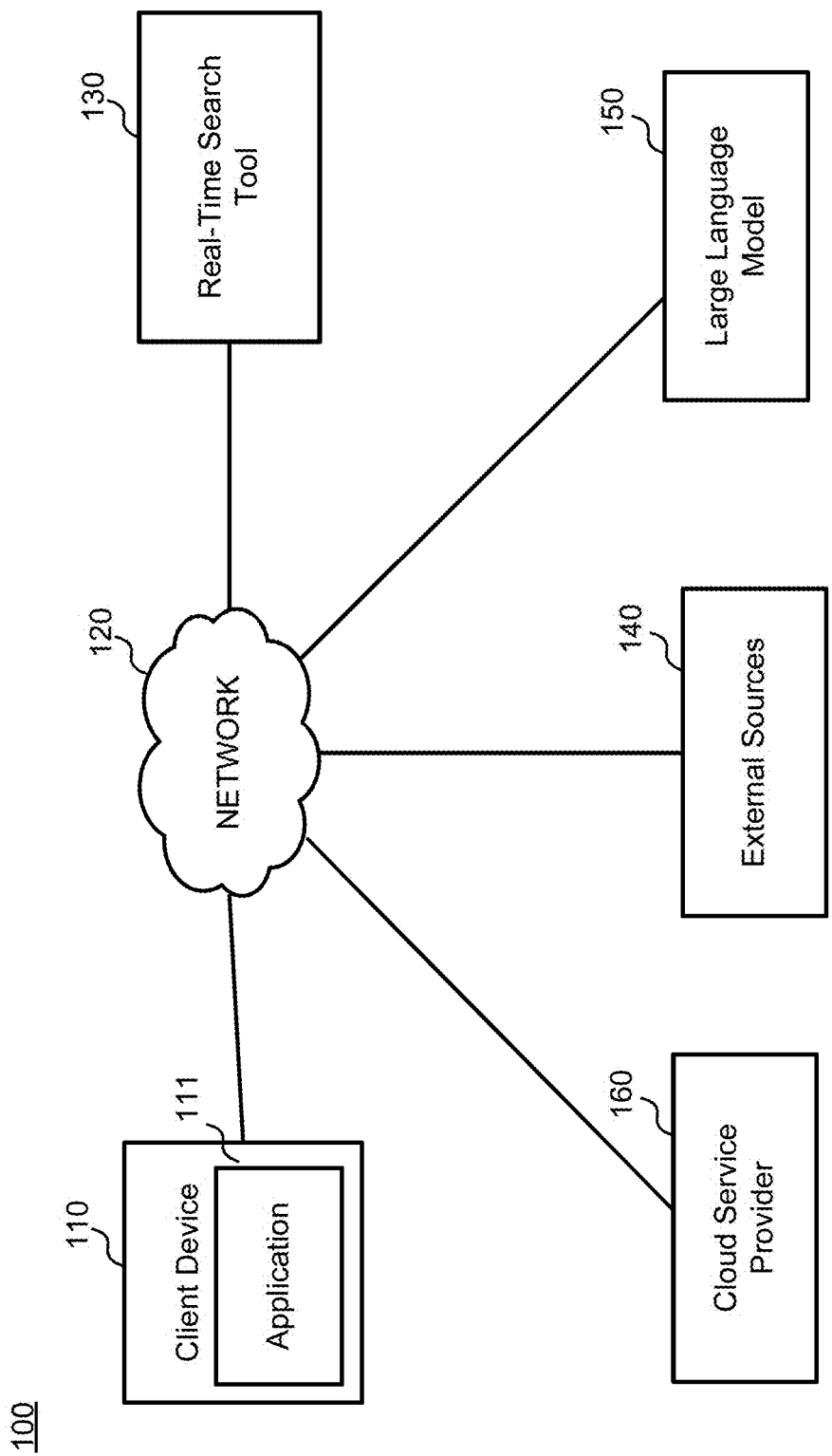
FIG. 1 illustrates one embodiment of a system environment for implementing a real-time search tool.

FIG. 1 illustrates one embodiment of a system environment for implementing a real-time search tool. As depicted in FIG. 1, environment 100 includes various devices, including client device 110, network 120, real-time search tool 130, external sources 140, large language model service 150, and cloud service provider 160. A tool, as used herein, is a collection of one or more cloud resources that together, perhaps in coordination with other entities such as application 111, form a client-facing tool.

Real-time search tool 130 is used by client devices 110 to perform searches for inquires input by users and provide partial real-time results. By dividing the task into sub-tasks using the systems and methods disclosed herein, an improved user interface is yielded that is able to produce partial results in real time to the user as those results are determined. This in turn enables a user to halt a current search and, as needed begin a new or updated search, on an iterative basis, until the user's questions are fully satisfied. What results is faster access to information and consumption of dramatically fewer computational resources, thereby resulting in an improvement in underlying technology and an improvement to the user interface itself. Moreover, efficiencies are achieved in an ability to allocate sub-tasks to CSPs, which improves utilization of computational resources.

Client device 110 may, by way of application 111, interface with real-time search tool 130. Application 111 is an application installed on client device 110 and/or accessible by way of a browser of client device 110. Some or all functionality of real-time search tool 130 described herein may be distributed or fully performed by application 111 on a client device, or vice versa. Where reference is made herein to activity performed by application 111, it equally applies that real-time search tool 130 may perform that activity off of the client device, and vice versa. Further details about the operation of real-time search tool 130 are described below with reference to FIG. 2.

Network 120 may be any network or combination of networks, such as the Internet, a wireless and/or wired network, a local area network, a wideband network, or any other data communications means that facilitates communications between devices, services, and sources disclosed herein.

External sources 140 include data sources used by real-time search tool 130 in order to output real-time partial search results. This may include specialized databases, such as a threat intelligence database storing data relating to known threats. While external sources 140 are referred to as external, where referenced, internal sources may also be analyzed that are stored within the set of servers that form real-time search tool 130. Large language model service 150 may be any service or combination of services that provide large language models (e.g., OpenAI, Llama3, etc.). In some embodiments, real-time search tool 130 may have its own internal large language model service 150 and need not use an external large language model service.

Cloud service provider 160 may include one or more cloud service providers, such as Amazon Web Services (AWS), Microsoft Azure, and the like. Cloud service provider 160 may be leveraged to process search tasks requested by real-time search tool 130. Cloud service provider 160 has load limitations, where a request having a load beyond a threshold size may cause the request to be rejected or for an error to occur. In some embodiments, external sources 140 are stored using cloud service provider 160, rather than a data center. Requests for searching through the external sources using cloud service provider 160 may be rejected where a load of the request exceeds a size, which may be the case when a search through millions, billions, or trillions (or more) of files is received. This may be the case because a given cluster to which tasks may be allocated may have finite capacity. Real-time search tool 130 may partition requests (e.g., form sub-tasks) in a manner that factors in limitations of cloud service provider 160, thereby realizing advantages of cloud service providers over alternate forms of storage. For example, cloud service providers have massive reliability due to redundant systems, low latency, and virtually unlimited scalability. Traditional data centers and on-prem solutions, on the other hand, suffer reliability constraints and latency constraints (e.g., where data centers that are geographically far apart need to intercommunicate in order to process a request). Cloud service providers are not traditionally used for search in the manner described herein at least because of their load limitations. The systems and methods disclosed herein enable usage of cloud service provider 160 for loads exceeding those limitations, thereby realizing the advantages of cloud service providers for real-time search.

Figure 2:
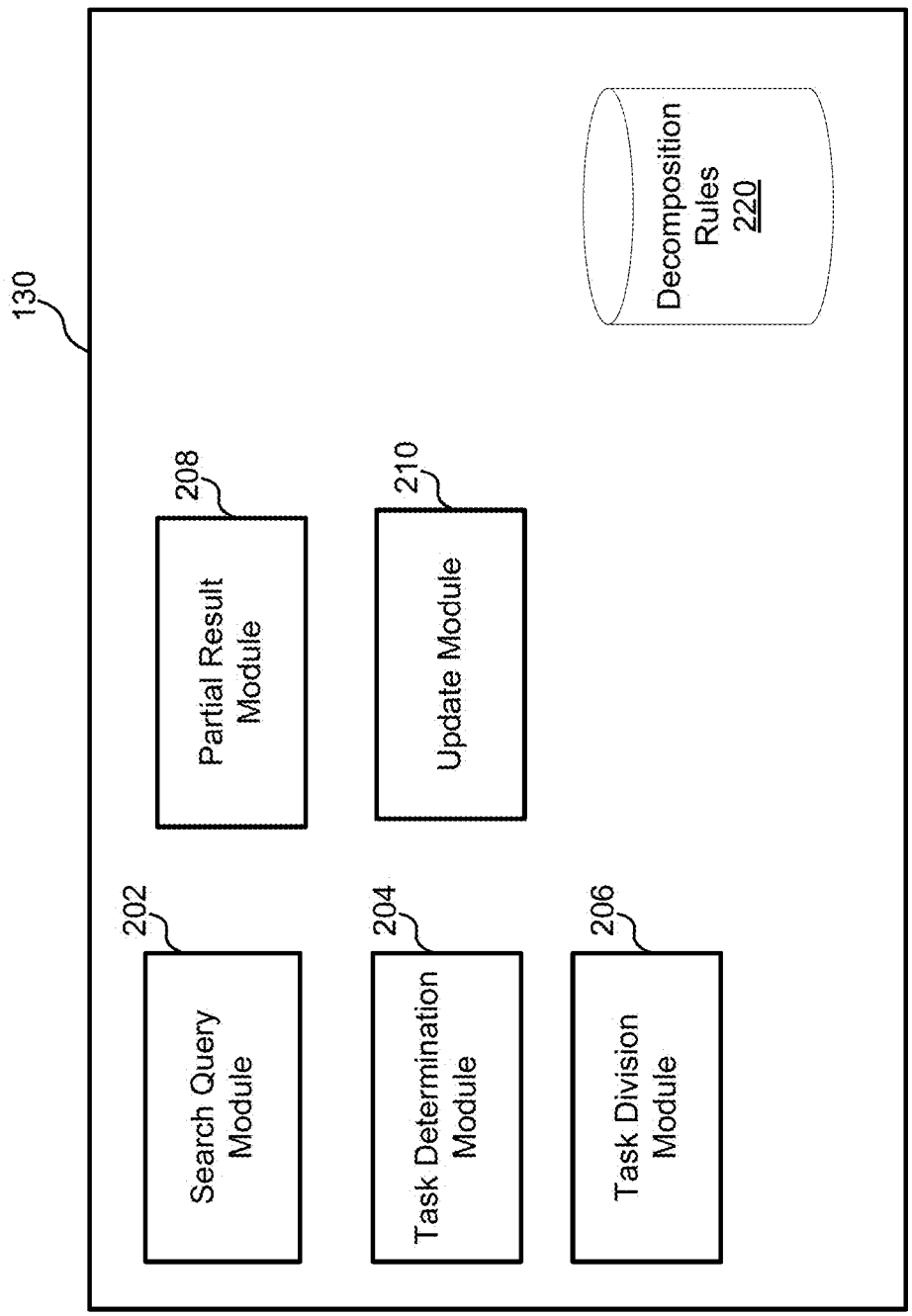
FIG. 2 illustrates one embodiment of exemplary modules of the real-time search tool.

FIG. 2 illustrates one embodiment of modules of the real-time search tool. As depicted in FIG. 2, real-time search tool 130 search query module 202, task determination module 204, task division module 206, partial result module 208, update module 210, and decomposition rules 220. These modules and databases are merely illustrative; fewer or more modules and/or databases may be used to achieve the functionality disclosed herein.

Search query module 202 receives user input of a search query by way of a search interface. The search query may be a natural language search, a query written in a query language, and/or a combination thereof. The query may relate to any topic. As a non-limiting example, the query may relate to threat hunting. A threat hunter for an entity may write, "In the last 24 hours, how many people have failed to log into their accounts in [entity]". Search query module 202 may predict a search (e.g., based on search queries provided by other users on a same team of the user, trending searches, etc.), and may prompt the user with one or more selectable options corresponding to predicted search queries that, when selected, cause a search to be performed.

Task determination module 204 determines a task (or multiple tasks) based on the search query. The term task, as used herein, may refer to one or more operations required to obtain an answer for the search query. In some embodiments, task determination module 204 may determine the task by prompting a large language model to output a rubric for where searches are to be performed to determine an answer to the search query (e.g., for threat hunting, data should be obtained from one or more specialized databases), where the rubric forms the task. In some embodiments, natural language processing may be used to identify operators within the search query, and the operators may be compared to rules that indicate operations corresponding to those operators, the operations together forming the task. Following the threat hunter example, the task(s) may be to pull logs across the entire entity of login attempts, and search those logs for indicia of failures in the login attempts, and then group those failures by person and count the number of individual persons. In some embodiments, task determination module 204 may determine a set of data that is necessary to process in order to process the task, and where that set of data is located across one or more databases. For example, a storage load of files to be processed on a cloud service provider 160 may be determined.

Task division module 206 divides the task into a plurality of sub-tasks, at least some of the plurality of sub-tasks divided for parallel processing by different compute components. Task division module 206 may divide the task according to decomposition rules 220. The decomposition rules 220 may be defined by an administrator of real-time search tool 130. Following the threat hunting example, for an entity having 10 k persons, with an average of two logins per day, there may be 20,000 records. The decomposition rules may indicate to divide by location (e.g., if there are four offices, handle each office separately). The decomposition rules may indicate to divide by time of day (e.g., 24 divisions, one hour per division). The decomposition rules may factor in peak or off-peak demand (e.g., fewer logins occur at night, so for night-time hours, use two hours per division, and for daytime hours use one hour per division).

Decomposition rules 220 may include rules to address limitations of various cloud service providers, such as load limits. For example, decomposition rules 220 may exist to compare load, after decomposing a task, or each decomposed task to a load limit. Responsive to detecting that a load limit will be exceeded by a decomposed task, a different rule may be applied (e.g., to re-divide the original task into smaller loads, to sub-divide tasks that exceed a maximum load of a service provider, etc.). By orchestrating decomposition rules to ensure load limits of cloud service providers are not exceeded, large loads that were previously unable to be run using cloud service providers can now quickly and seamlessly be run on cloud service providers. Cloud service providers can scale virtually infinitely. Decomposition rules 220 may vary depending on an urgency of a task (e.g., a user specifies a need for results within a time frame, such as a minute, and hour, a day, etc.). Decomposition rules 220 may, based on a projected timeframe to run a load, decompose the task to be run within the requested timeframe.

In some embodiments, task division module 206 determines how to divide the task depending on the type of task. Task division module 206 determines the type of task either using a large language model or by matching the search query or an extraction thereof to a template having a corresponding type. Task division module 206 then references a data structure mapping the type of task to a decomposition rule (e.g., stored in decomposition rules 220), and goes on to divide the task into the plurality of sub-tasks based on the decomposition rule.

Decomposition rules 220 may result in an uneven distribution of work between the plurality of sub-tasks. That is, when dividing tasks among a plurality of workers, the division may not be exactly even. For example, login attempts may vary during daytime hours, where they disproportionately occur as persons log in in the morning and again after a lunch break. This may result in a staggered determination of results for sub-tasks. In order to minimize staggering, where some decomposed tasks exceed load limits, a different decomposition rule may be reapplied to an entire task in order to bring all decomposed tasks within a load limit while keeping sub-tasks at roughly the same size for parallel processing.

In some embodiments, decomposition rules 220 may have rules for a same task that each may be conditioned on how many cloud computing resources are available for a given task. For example, tasks and/or sub-tasks may be executed to completion by cloud resources such as compute cores, virtual machines, physical machines, and so on. An entity of which client device 110 is associated may have access to a predefined set or amount of cloud resources, and some of the predefined allocations may already be committed to existing tasks, thereby leaving a subset for a next task. Decompositions rules 220 may indicate how to perform subdivisions depending on what compute resource allocations are available. Cloud resources may be provided directly by real-time search tool 130 and/or provided by third party cloud service providers.

In some embodiments, task division module 206 may receive an error message from a cloud service provider 160 responsive to requesting execution of a sub-task. The error message may be due to the sub-task exceeding load limits of the cloud service provider 160. In an embodiment, responsive to receiving the error message, task division module 206 may divide the sub-task into two or more further sub-divisions. In another embodiment, responsive to receiving the error message, task division module 206 may instruct a halt to processing of the sub-tasks, and may obtain a different decomposition rule 220 to reform different sub-tasks from the task (e.g., to ensure that all sub-tasks are roughly of a same size). Task division module 206 may then re-attempt processing of all sub-tasks by the cloud service provider 160.

Partial result module 208 receives publication of partial results from the different compute components as those partial results are completed by their respective compute components (e.g., cloud processing units). Optionally, partial result module 208 inputs the partial results into a reducer to create an aggregate partial result (e.g., a total number of individual users who had login failures within the last 24 hours, by aggregating records and consolidating them by individual users where some users had multiple login failures in the same period).

Update module 210 generates for display the aggregate partial result within the search interface. Update module 210 updates the aggregate partial result in real time as further partial results are published (and reduced where this is requisite before update). Users thereby experienced an improved user interface where, rather than having to wait minutes or hours for search results requiring a large amount of processing, users can derive insights in real time as partial results are obtained.

Update module 210 may, while a current query is being processed, receive an updated search query from the user. For example, the user may determine that a bulk of failed login attempts are in a certain office, and may query for users having failed login attempts in that office who have taken an additional action, such as sending files external to the entity by email. Responsive to receiving the updated search query, update module 210 may cease the processing by the different compute components in furtherance of obtaining further partial results for the revised query. This may be performed by initiating division of a new task based on the updated search query for real-time partial result updates pertaining to the new query in the search interface. Division of sub-tasks may occur across thousands or even millions (or more) of cores for parallel processing, which is extremely computationally expensive. By ceasing processing of incomplete sub-tasks, processing by these myriad cores may be ceased upon commencing a new search, thereby dramatically reducing computational burden imposed by the initial search.

While threat hunting is used as an example in this specification, tasks can relate to any matter, such as observability and any other data analysis of large repositories of data.

Computing Machine Architecture

Figure 3:
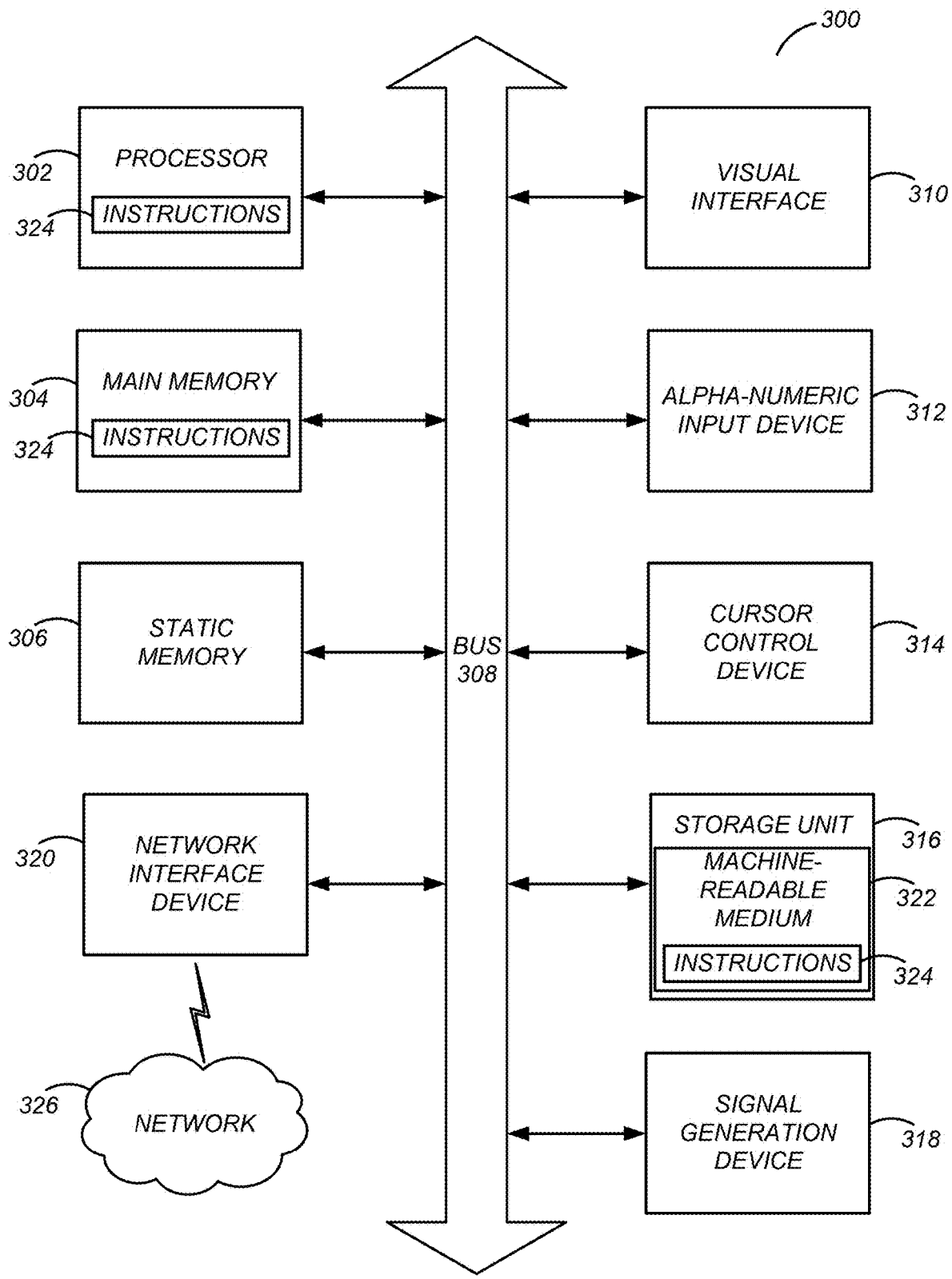
FIG. 3 is a block diagram illustrating components of an example machine able to read instructions from a machine-readable medium and execute them in a processor (or controller).

FIG. (FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alphanumeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for implementing a task-oriented recommendation service through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

EXEMPLARY USE CASES

Figure 4B:
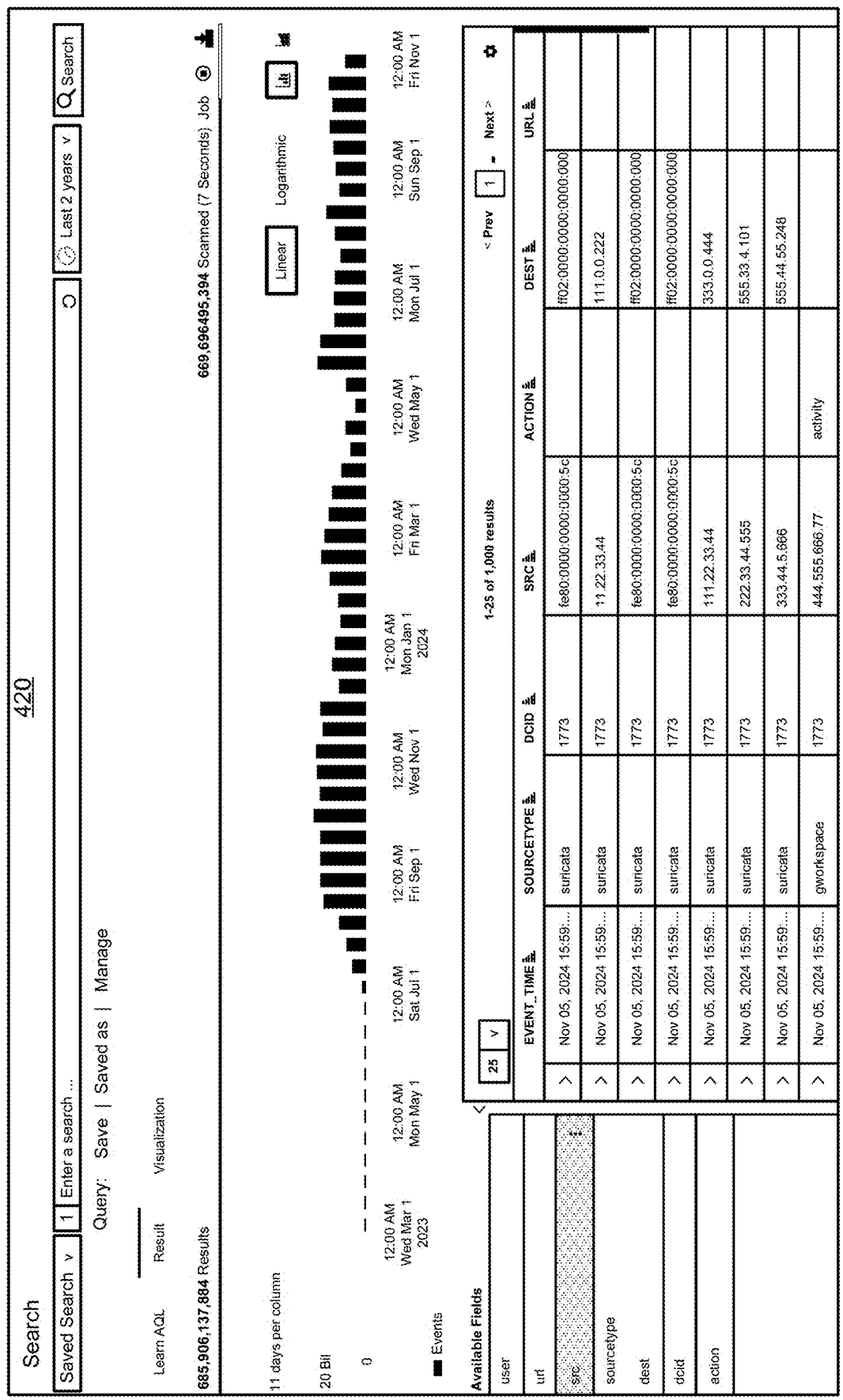
Figure 4C:
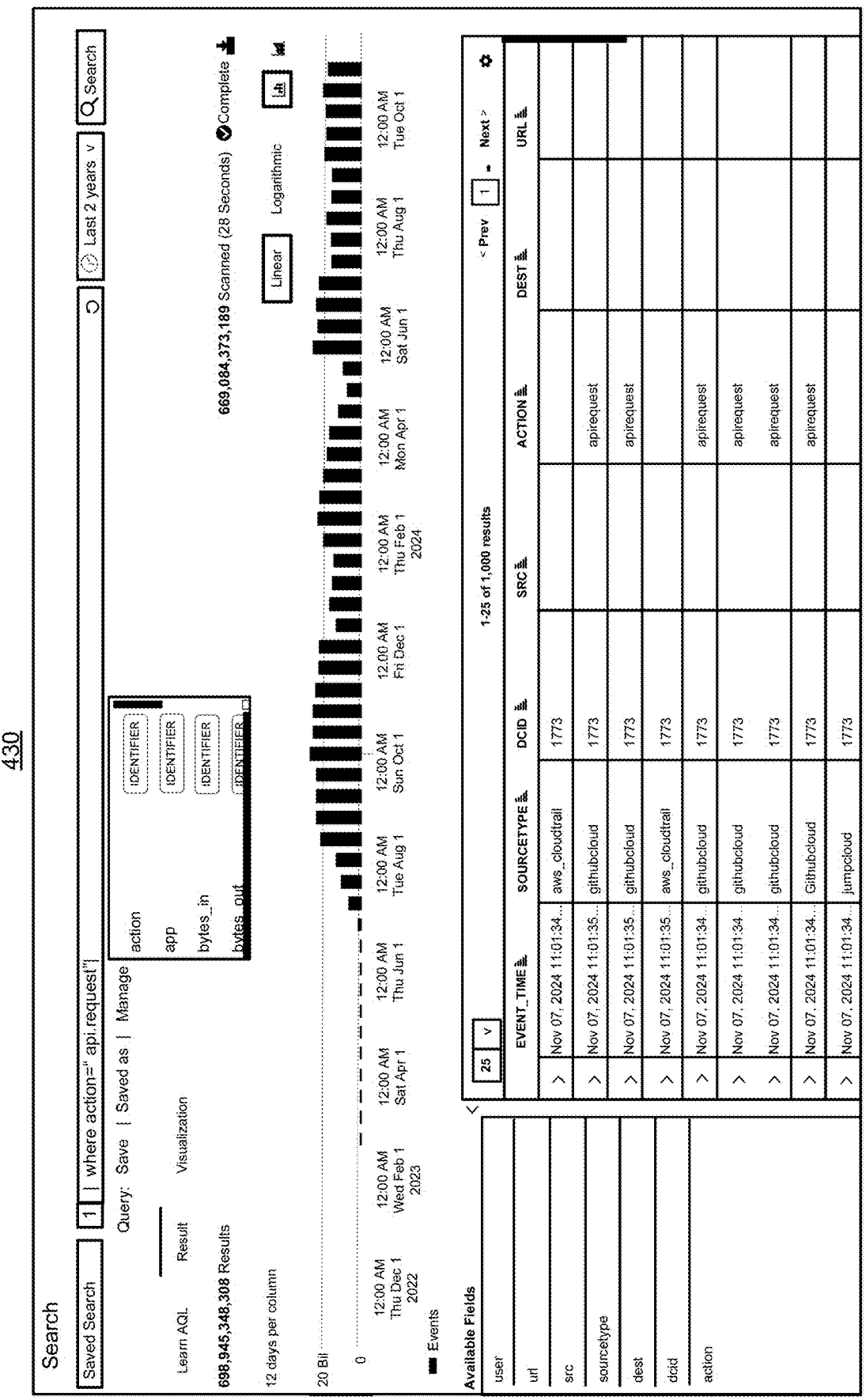
Figure 4D:
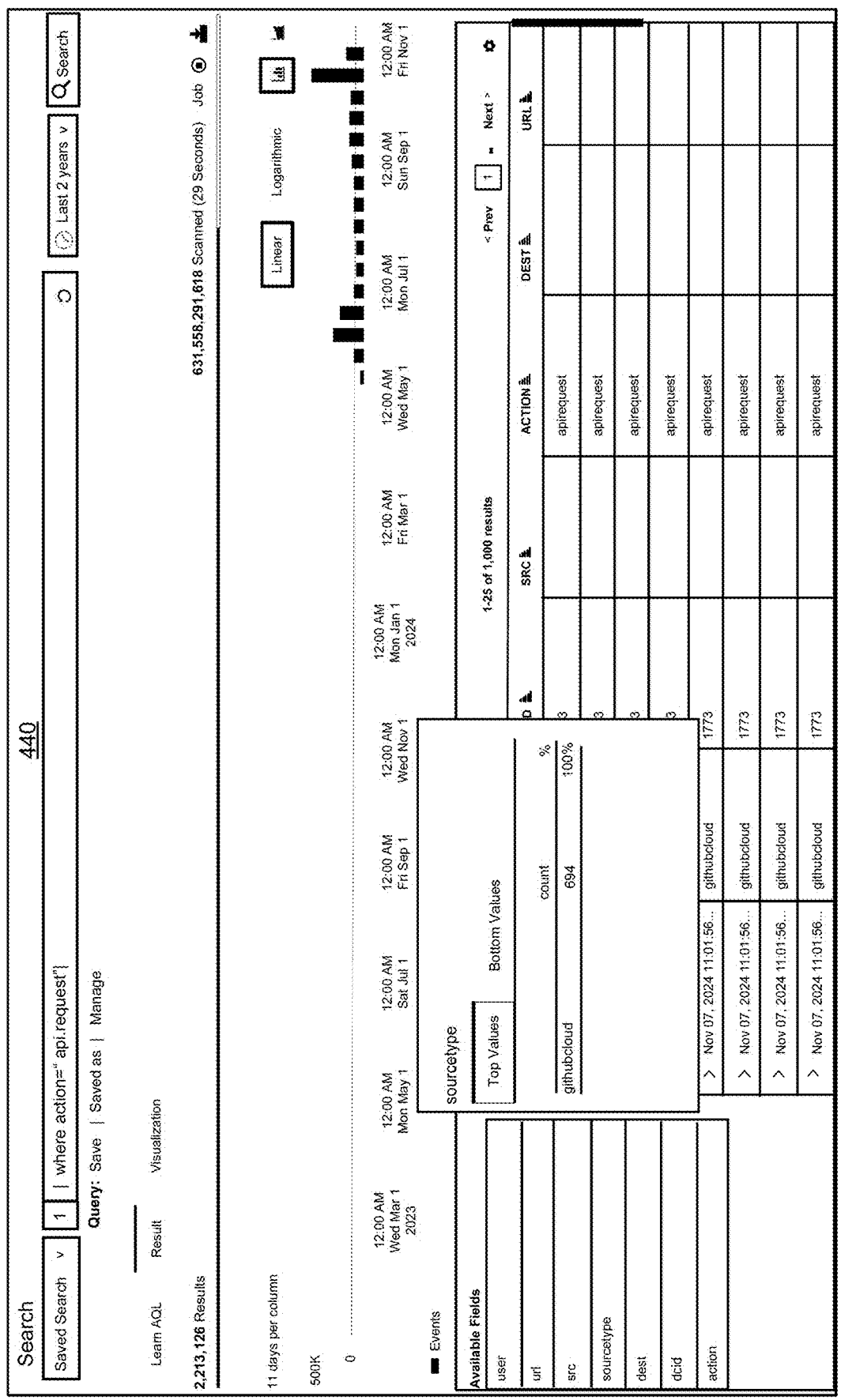

FIGS. 4A-4E illustrate a sequence of user interfaces as a search query is updated incrementally during a real-time search. As depicted in FIG. 4A, user interface 410 enables a user to enter a search query, such as a natural language search or a query language search (e.g., using application 111). User interface 410 may also accept a time range (e.g., from a scroll down menu including candidate time ranges). As shown in user interface 410, a user is selecting to confine items that are searched to the last 2 years. Shown in user interface 420 of FIG. 4B, all items (e.g., logs) for a given entity are searched, and results are shown populating on the bottom of the screen. User interface 410 presents results in real time as they are obtained, even while the search for further files continues. This results in an improved user interface, where the user is empowered to refine the search and begin a new search using partial information as a search continues to be performed and new data is populated.

Following from FIG. 4B, a user who is, for example, threat hunting, may notice that a threat may exist where an action of api.request is made. The user may, as shown in user interface 430 of FIG. 4C, revise the query to only include items including an api.request action, thereby truncating the prior search and relaunching the search on a far smaller set of files, saving dramatic processing power and latency. This can be seen in user interface 440 of FIG. 4D, where a user can begin threat hunting on matching items when as few as approximately 2.2 million files are ready out of over 600 billion scanned items. The user interface can be used for further interaction by the user, where a user may select attributes directly from a results table, such as to also limit the search to files where a source type=githubcloud. Turning to user interface 450 of FIG. 4E, the user may manually add to the query a request for an aggregation of a count of matching files, and the count may be updated as the search progresses.

Figure 5A:
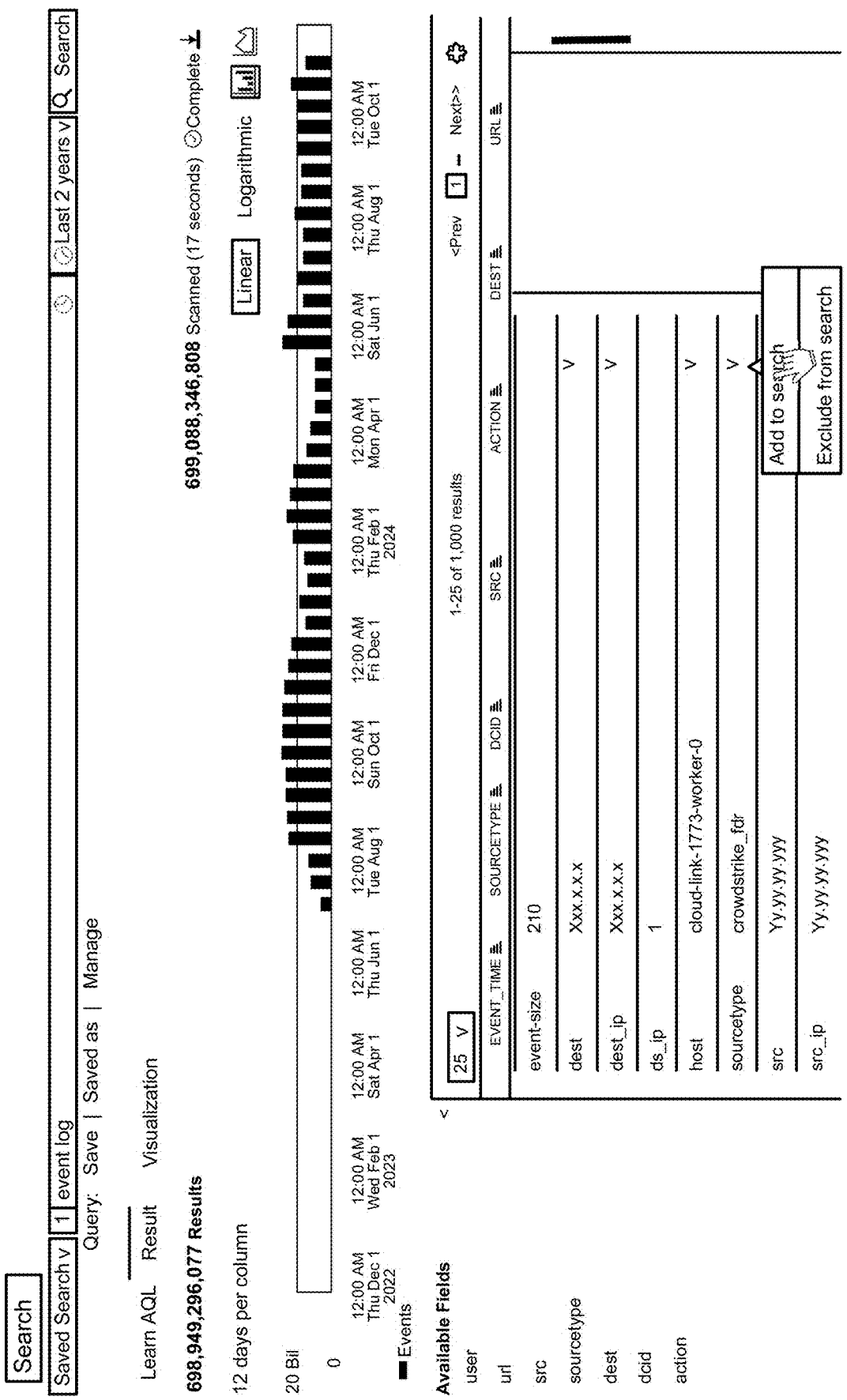
FIGS. 5A-5B illustrate a sequence of user interfaces showing user interface options for incrementally updating a search query.
Figure 5B:
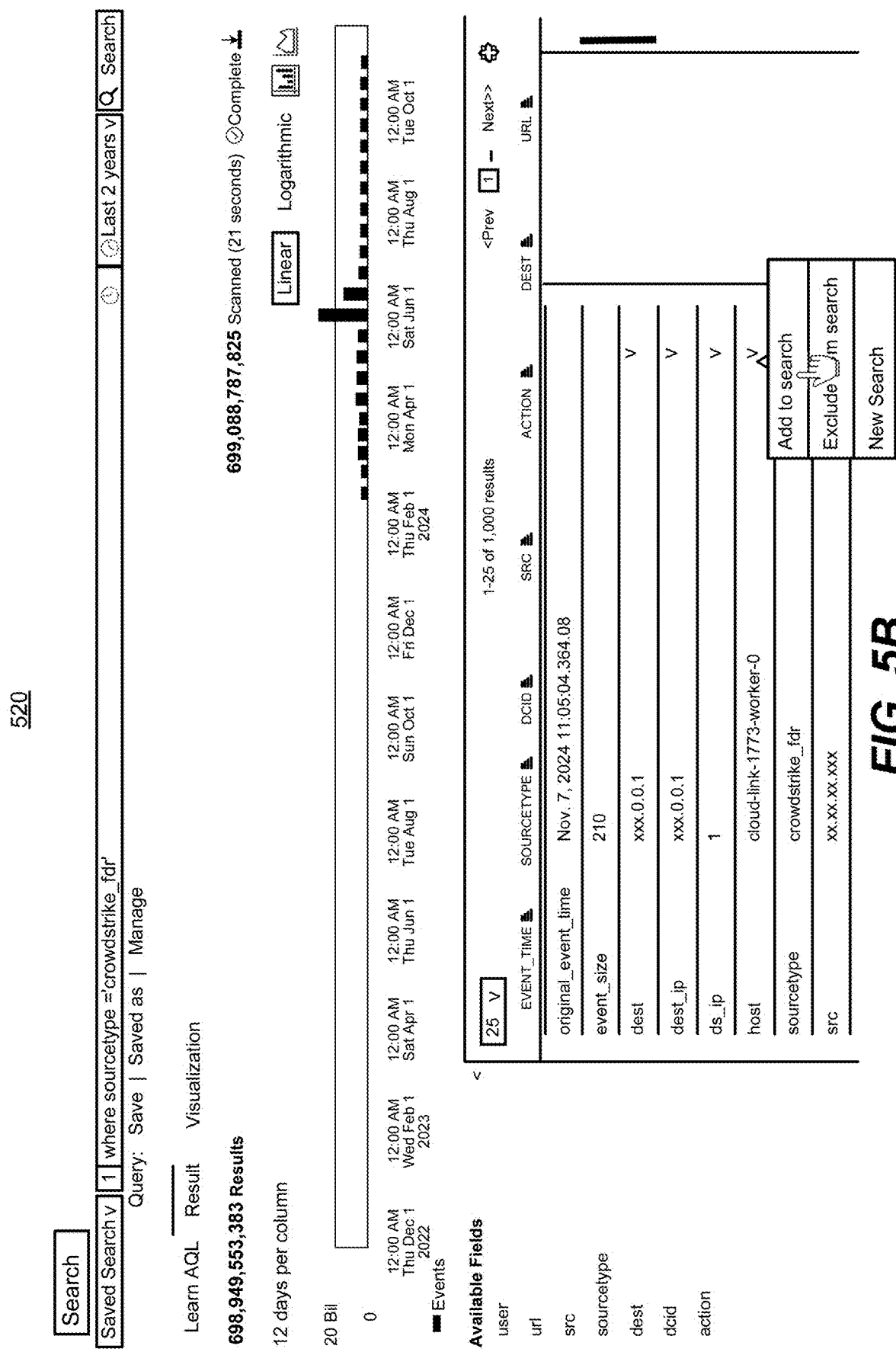

FIGS. 5A-5B illustrate a sequence of user interfaces showing user interface options for incrementally updating a search query. As shown in FIG. 5A, a user may interact with user interface 510 during a search for event logs, noticing that source types of crowdstrike_fdr may be indicative of a threat and adding that source type to the search. As shown in FIG. 5B, as the new search launches for matching files, the user may continue to edit the search using user interface 520, indicating a specific IP address of interest. Following each interaction, the prior search may be truncated and a new search may be performed, avoiding needless compute power spent on finishing the prior search given that the user is satisfied with the partial result.

Figure 6A:
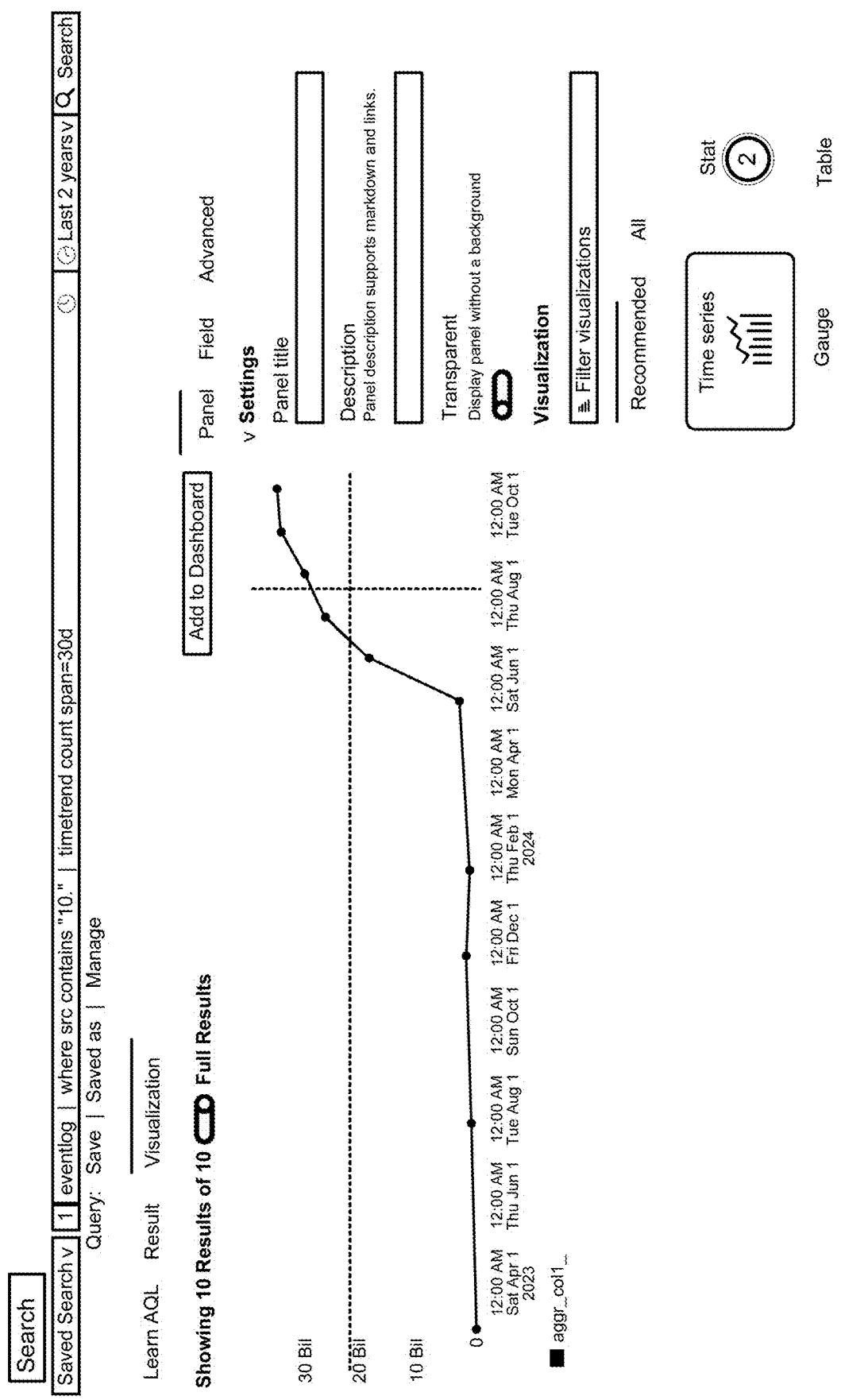
FIGS. 6A-6C illustrate a sequence of user interfaces showing visual representation interaction on partial results of a search.
Figure 6B:
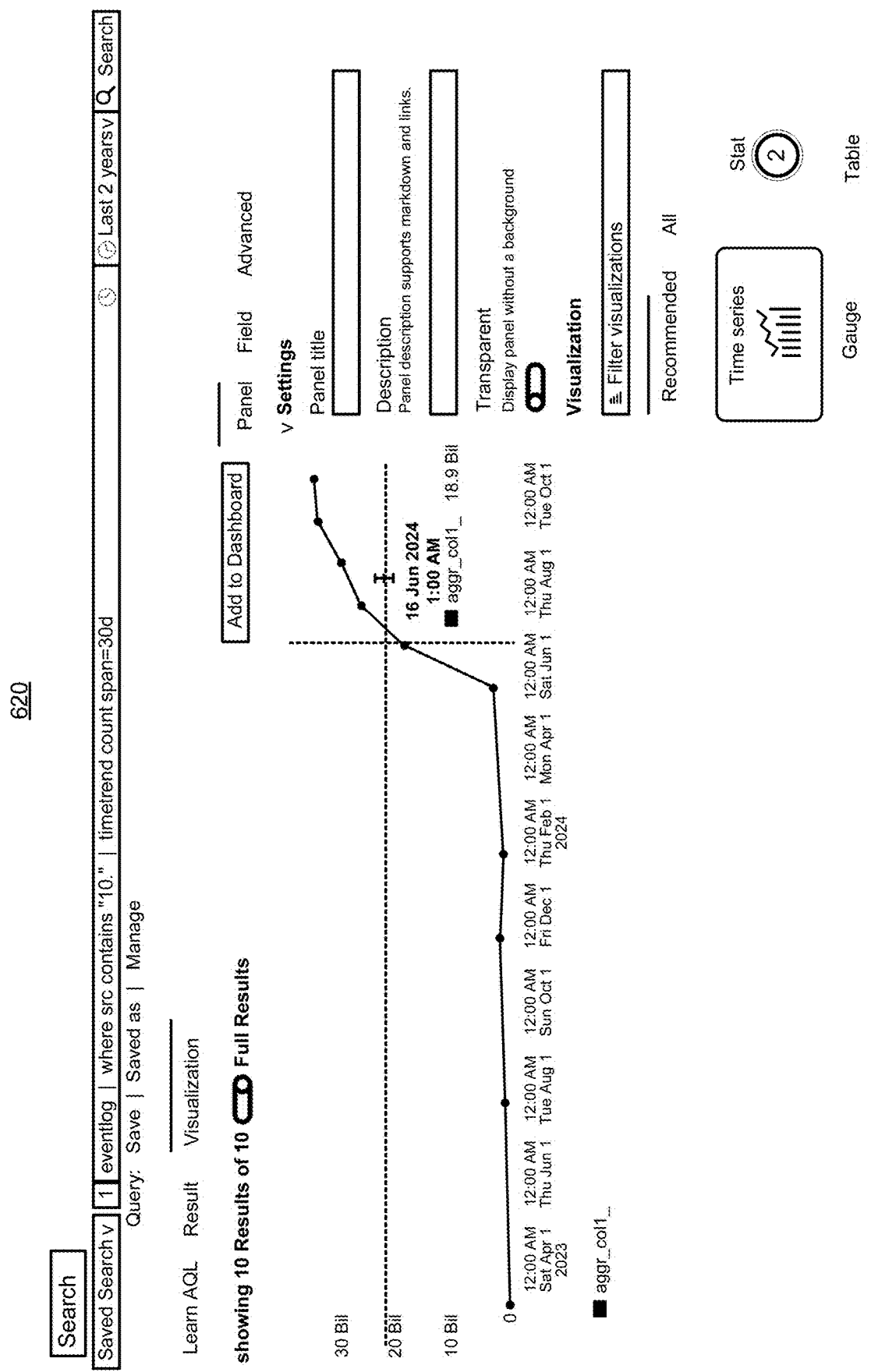
Figure 6C:
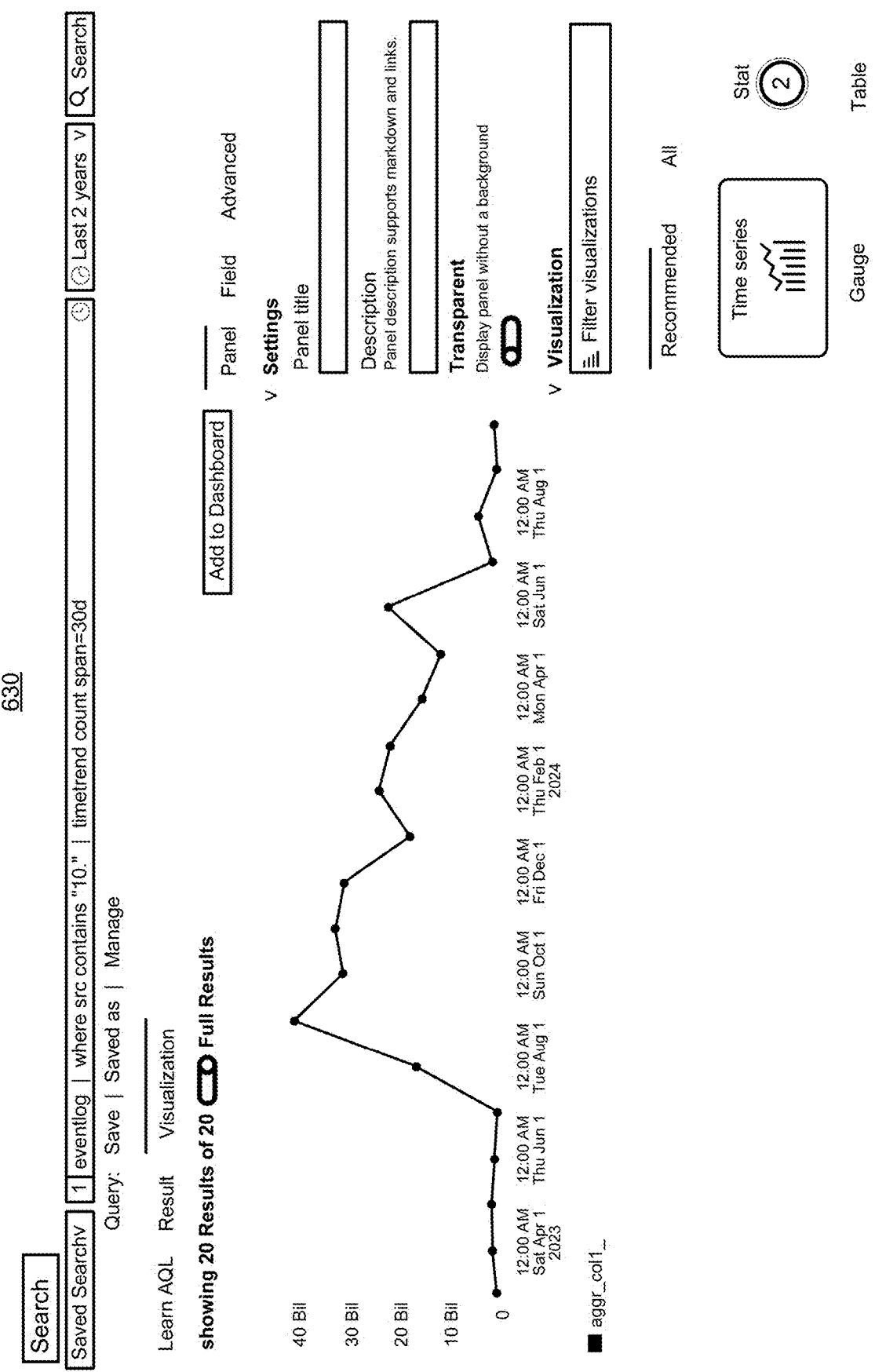

FIGS. 6A-6C illustrate a sequence of user interfaces showing visual representation interaction on partial results of a search. As shown in FIG. 6A, user interface 610 shows a visualization of results of a search through event logs that have a source IP address including "10.", where a time trend is requested to show a count aggregation every 30 days. The user interface may show flat activity until around June 1, and then a spike in activity. As shown in FIG. 6B, the user interface 620 may receive a command to expand activity over a highlighted or otherwise selected portion of the visualization (e.g., around the spike in the graph). This may result in a more focused visualization as shown in user interface 630 of FIG. 6C. Note that the visualization continually changes as new results are obtained in the course of the progression of the search.

FIG. 7 illustrates a flowchart of a process for providing partial search results a sub-tasks of a search query task are completed. Process 700 may be executed by one or more processors (e.g., processor 302) executing instructions (e.g., 324) store on memory of non-transitory media (e.g., 304). The one or more processors may cause various modules of real-time search tool 130 to execute the instructions. Process 700 may begin with real-time search tool 130 receiving 710 user input of a search query by way of a search interface (e.g., using search query module 202). Real-time search tool 130 may determine 720 a task based on the search query (e.g., using task determination module 204).

Real-time search tool 130 divides 730 the task into a plurality of sub-tasks, at least some of the plurality of sub-tasks divided for parallel processing by different compute components (e.g. using task division module 206). Real-time search tool 130 receives 740 publication of partial results from the different compute components as those partial results are completed by their respective compute components (e.g., using partial result module 208), and optionally inputs 750 the partial results into a reducer to create an aggregate partial result (e.g., using partial result module 208). Real-time search tool 130 generates for display 760 the aggregate partial result within the search interface, where the aggregate partial result is updated in real time as further partial results are published (e.g., using update module 210). The search query may be updated based on aggregate partial results, causing sub-tasks to halt and new sub-tasks to be determined and executed.

What is claimed is:

1. A method comprising:
receiving user input of a search query from a user by way of a search interface;
determining, using a large language model, a task based on the search query;
dividing the task into a plurality of sub-tasks to be performed by cloud service provider (CSP) components, at least some of the plurality of sub-tasks divided for parallel processing by different ones of the CSP components, each sub-task within a load limit of a given CSP component, wherein dividing the task into a plurality of sub-tasks comprises:
responsive to determining that a prior division resulted in at least one given sub-task exceeding a CSP component load limit:

halting processing of prior sub-tasks from the prior division;
obtaining a different decomposition rule to reform different sub-tasks; and
determining the plurality of sub-tasks using the different decomposition rule;
receiving publication of partial results from the different CSP components as those partial results are completed by their respective CSP components;
inputting the partial results into a reducer to create an aggregate partial result; and
generating for display the aggregate partial result within the search interface, wherein the aggregate partial result is updated in real time as further partial results are published.

2. The method of claim 1, further comprising:
determining a type of the task;
referencing a data structure mapping the type of task to a decomposition rule; and
dividing the task into the plurality of sub-tasks based on the decomposition rule.

3. The method of claim 2, wherein the decomposition rule results in an uneven distribution of work between the plurality of sub-tasks.

4. The method of claim 1, further comprising:
receiving an updated search query from the user; and
responsive to receiving the updated search query, ceasing the processing by the different CSP components in furtherance of obtaining further partial results.

5. The method of claim 4, further comprising initiating division of a new task based on the updated search query for real-time partial result updates in the search interface.

6. The method of claim 1, wherein the search query is a natural language query.

7. A non-transitory computer-readable medium comprising memory with instructions encoded thereon that, when executed by one or more processors, cause the one or more processors to perform operations, the instructions comprising instructions to:
receive user input of a search query from a user by way of a search interface;
determine, using a large language model, a task based on the search query;
divide the task into a plurality of sub-tasks to be performed by cloud service provider (CSP) components, at least some of the plurality of sub-tasks divided for parallel processing by different ones of the CSP components, each sub-task within a load limit of a given CSP component, wherein dividing the task into a plurality of sub-tasks comprises:
responsive to determining that a prior division resulted in at least one given sub-task exceeding a CSP component load limit:
halting processing of prior sub-tasks from the prior division;
obtaining a different decomposition rule to reform different sub-tasks; and
determining the plurality of sub-tasks using the different decomposition rule;
receive publication of partial results from the different CSP components as those partial results are completed by their respective CSP components;
input the partial results into a reducer to create an aggregate partial result; and
generate for display the aggregate partial result within the search interface, wherein the aggregate partial result is updated in real time as further partial results are published.

8. The non-transitory computer-readable medium of claim 7, the instructions further comprising instructions to:
determine a type of the task;
reference a data structure mapping the type of task to a decomposition rule; and
divide the task into the plurality of sub-tasks based on the decomposition rule.

9. The non-transitory computer-readable medium of claim 8, wherein the decomposition rule results in an uneven distribution of work between the plurality of sub-tasks.

10. The non-transitory computer-readable medium of claim 7, the instructions further comprising instructions to:
receive an updated search query from the user; and
responsive to receiving the updated search query, cease the processing by the different CSP components in furtherance of obtaining further partial results.

11. The non-transitory computer-readable medium of claim 10, the instructions further comprising instructions to initiate division of a new task based on the updated search query for real-time partial result updates in the search interface.

12. The non-transitory computer-readable medium of claim 7, wherein the search query is a natural language query.

13. A system comprising:
memory with instructions encoded thereon; and
one or more processors that, when executing the instructions, are caused to perform operations comprising:
receiving user input of a search query from a user by way of a search interface;
determining, using a large language model, a task based on the search query;
dividing the task into a plurality of sub-tasks to be performed by cloud service provider (CSP) components, at least some of the plurality of sub-tasks divided for parallel processing by different ones of the CSP components, each sub-task within a load limit of a given CSP component, wherein dividing the task into a plurality of sub-tasks comprises:
responsive to determining that a prior division resulted in at least one given sub-task exceeding a CSP component load limit:
halting processing of prior sub-tasks from the prior division;
obtaining a different decomposition rule to reform different sub-tasks; and
determining the plurality of sub-tasks using the different decomposition rule;
receiving publication of partial results from the different CSP components as those partial results are completed by their respective CSP components;
inputting the partial results into a reducer to create an aggregate partial result; and
generating for display the aggregate partial result within the search interface, wherein the aggregate partial result is updated in real time as further partial results are published.

14. The system of claim 13, the operations further comprising:
determining a type of the task;
referencing a data structure mapping the type of task to a decomposition rule; and dividing the task into the plurality of sub-tasks based on the decomposition rule.

15. The system of claim 14, wherein the decomposition rule results in an uneven distribution of work between the plurality of sub-tasks.

16. The system of claim 13, the operations further comprising:
   receiving an updated search query from the user; and
   responsive to receiving the updated search query, ceasing the processing by the different CSP components in furtherance of obtaining further partial results.

17. The system of claim 16, the operations further comprising initiating division of a new task based on the updated search query for real-time partial result updates in the search interface.

18. The system of claim 13, wherein the search query is a natural language query.

\* \* \* \* \*